United States Patent [19]
Rossi

[11] 3,962,086
[45] June 8, 1976

[54] APPARATUS FOR THE SEPARATION OF THE COMPONENTS OF AN AQUEOUS CONCRETE GROUT

[75] Inventor: Lionello Rossi, Grottaferrata, Italy

[73] Assignee: Fogt Industriemaschinenvertretung A.G., Zurich, Switzerland

[22] Filed: Aug. 13, 1974

[21] Appl. No.: 497,101

[30] Foreign Application Priority Data
Aug. 31, 1973  Italy ................................. 52286/73

[52] U.S. Cl. ............................... 210/138; 210/260; 210/523
[51] Int. Cl.² ........................................ B01D 21/06
[58] Field of Search ........... 210/138, 167, 259, 260, 210/523, 524, 526, 195 R

[56] References Cited
UNITED STATES PATENTS

| | | | |
|---|---|---|---|
| 1,350,154 | 8/1920 | Hamilton | 210/523 |
| 2,701,058 | 2/1955 | Leeman | 210/523 |
| 2,919,808 | 1/1960 | Hilkemeier | 210/523 |
| 3,278,022 | 10/1966 | Moeschier | 210/195 X |
| 3,334,749 | 8/1967 | Ladd | 210/167 |
| 3,384,239 | 5/1968 | Berardl | 210/260 |
| 3,674,145 | 7/1972 | Schmutzler | 210/526 |
| 3,726,402 | 4/1973 | Goutos | 210/138 |

*Primary Examiner*—Theodore A. Granger
*Attorney, Agent, or Firm*—Wigman & Cohen

[57] ABSTRACT

An apparatus for the separation of the components of an aqueous concrete grout obtained from washing operations of automotive concrete mixers in a washing station comprising two tanks connected in series, into the first of which are mounted means to separate in sequence and to discharge gravel and crushed stones and then sand, while into the second tank means are provided to perform the separation of the cement from the water by decantation and means to collect and discharge said cement out of said tank, said means consisting of a longitudinal endless conveyor carrying transverse scraping bars sliding along the bottom of said tank, a pump to suck the purified water from said second tank and to convey it until the washing station to be distributed into the drums of the mixers from which is discharged into the inside of a first unit of the first tank provided to separate the gravel and crushed stones means being also arranged at the end of the first tank to collect continuously the water from said tank and to convey it into the second tank.

10 Claims, 4 Drawing Figures

APPARATUS FOR THE SEPARATION OF THE COMPONENTS OF AN AQUEOUS CONCRETE GROUT

The present invention relates to an apparatus for separating the components of an aqueous concrete grout obtained from washing operations of automotive concrete mixers designed to transport concrete ready for use from concrete mixing equipments to utilization sites in order that the recovered aggregates, i.e. sand, gravel and crushed stones may be used again and also in order to prevent that masses of set concrete may be produced which are often the results of the discharge of the waters derived from the washing of the concrete mixers. Said concrete masses cause the soil to become sterile: further they are difficult to be removed, if the soil on which the washing waters have been discharged has to be used subsequently for agricultural or building purposes and also in order to prevent pollutions of waterways, rivers or lakes in the event that said washing waters are directly discharged into said waterways or their drainages are collected by them.

This apparatus comprises a washing station for a number of automotive concrete mixers, and two tanks connected in series one to another, into the first of which firstly the gravel and crushed stones are separated and then the sand, while in the second tank the separation of the cement from the water is carried out; means are provided for recycling the washing water after being duly purified and separated from the solid components of the concrete, to said recycle water pure water being added in order to compensate for losses, as well as to lower the water salinity.

At the rear end of the first tank a bucket conveyor is mounted to collect from the tank and to lift continuously the water so as to convey it to be discharged into the second tank, sand, gravel and crushed stones during its travel along the first tank, while it still contains cement in suspension.

The present invention solves the problem of the separation of the concrete components by simple mechanical means which are so constructed, designed and located as to have few members in contact with the said materials which, as well known, cause a considerable wear under friction conditions, said members being very simple and are provided with strong and easily replaceable parts, while all the transmission and driving means are mounted out of the tanks so that the apparatus has a long life and is practically not liable to be damaged as compared with the already known similar apparatus which are very complex and occupy a considerable space.

The accompanying drawings show, merely by way of indicative example, an embodiment of this invention; in the drawings.

Figure 1:
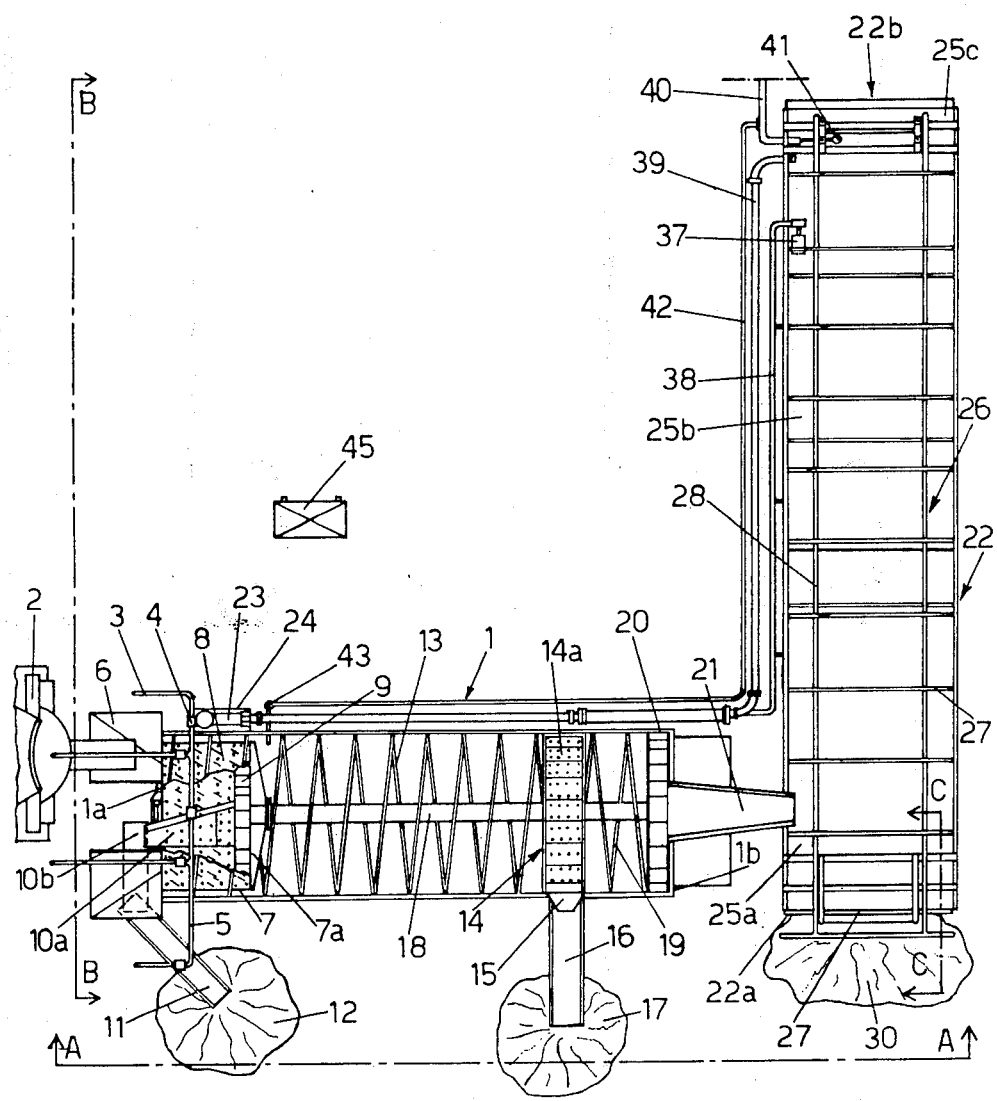
FIG. 1 is a diagrammatic top view of the apparatus according to the invention.
Figure 2:
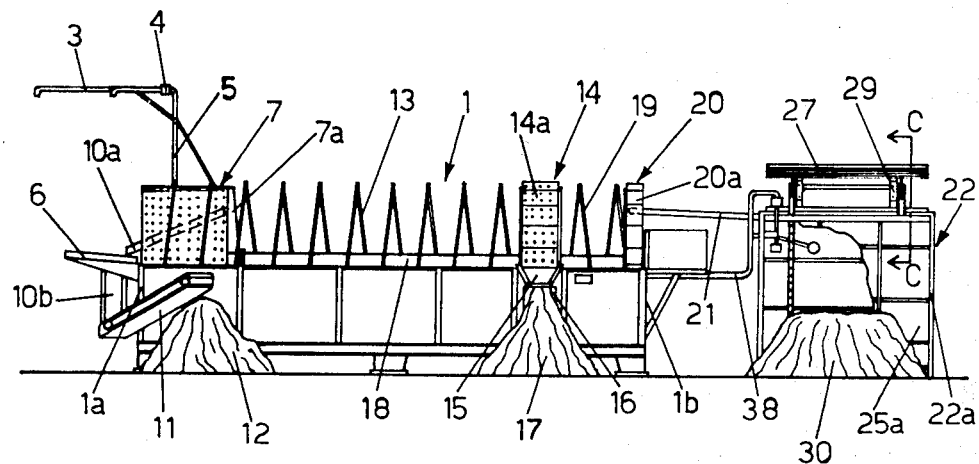
FIG. 2 is an elevational side view of the apparatus taken on line A—A of FIG. 1.

Now referring to the drawings, at 1 is generally indicated the first tank having a semicylindrical shape, the charging head 1a which is placed near the washing station of the automative concrete mixers 2, only one of which has been partially represented in the drawings. In the revolving drum of each mixer 2 water will be fed through one of a plurality of distribution pipes 3, said water being pure water recovered from the hereinbelow described treatment of the washing waters performed in the apparatus of this invention. The pure water is distributed in sequence into the pipes 3, since each driver as he reaches his parking place in the washing station, presses a push-button (not shown) concerning his parking place so that he is included in a reservation order for the distribution of the washing water, each push-button controlling an electromagnetic device causing a cock to be opened which controls the feeding pipe 5 which feeds water into the respective pipe 3 relative to said parking place.

As washing water has been fed into the drum of an automotive mixer 2, said drum is caused to rotate for a predetermined time interval sufficient so that water can remove the concrete adherent to the inner surfaces of said drum, and then as the water has well cleaned said inner surface of the mixer drum, the washing water is discharged into a trough 6 which is so shaped and positioned to serve for the discharge of the washing water of more than one mixer 2, said trough 6 conveying the water to fall down into the tank 1 in the inside of a revolving drum 7 which is mounted near the front end 1a of the tank 1, said drum 7 is coaxial with the tank 1 and has an open front end, a solid rear head 7a and a perforated peripheral wall. Near its front end and on the inside surface of the drum 7, 7a guiding helical blades 8 are provided, while near the rear solid head 7a inner perforated buckets 9 are carried by the peripheral wall of said drum 7, 7a. The orifices arranged in the peripheral wall of the drum 7 and those arranged through the walls of buckets 9 have such sizes as to retain the gravel and the crushed stones so that only the sand and the cement in suspension into the water can freely pass therethrough. The gravel and crushed stones collected by the crown of buckets 9 are lifted owing to the rotation of the drum 7, 7a and as they reach the uppermost level are discharged into an inclined channel formed by a first section 10a having perforated wall and substantially longitudinal direction and which is located in the inside of the drum 7, 7a in a stationary position, and by a second section 10b extending beyond the tank 1 and having its discharging end positioned over a belt conveyor 11 or the like provided to convey the gravel and the like to fall down on a heap 12.

The solid rear head 7a of the drum 7 is made integral with a shaft 18 extending longitudinally along the axis of the semicylindrical tank 1 and carrying, beyond the drum 7, 7a, a peripheral helical blade 13 contacting the inner surface of the peripheral wall of the tank 1. Beyond the helical blade 13 the shaft 18 carries a tubular coaxial body 14 having an outer diameter smaller than the inner diameter of the tank 1, about said body 14 a series of buckets 14a being provided made of perforated metal sheet, the outermost edges of which slide substantially in cntact with the inner cylindrical surface of the tank 1 so as to collect into said buckets 14a the sand which deposits on the bottom of said tank 1 and to lift it upwards up to discharge said sand into a lateral trough 15 feeding a belt conveyor 16 or the like which discharges said sand on the heap 17. Of course, the orifices of the buckets 14a have such a size as to prevent the passage of the sand therethrough, letting the water freely pass which still carries in suspension the cement.

Beyond the unit 14, 14a on the shaft 18 is mounted a second peripheral helical blade 19 extending about the shaft 13 in a direction opposite to that of the helical blade 13 so that as a result of the rotation of the shaft 13 the helical blade 13 pushes the material towards the rear or discharge end 1b of the tank 1, while the helical blade 19 pushes the material again back towards the unit 14, 14a in order to ensure the separation also of that sand which could go beyond said unit 14, 14a.

Near the rear end 1b of the tank 1, the shaft 18 further carries a revolving lifting device 20 comprising a drum supporting a crown of inner buckets 20a having solid walls and which collect and lift the water having still cement in suspension and which is discharged into a channel 21 which extends from the inside of the bucket lifting device 20 up to come over the second tank 22; the axis of this latter may be set at a right angle to that of the tank 1, but it could be also differently positioned.

The level of the water in the tank 1 is controlled by a float valve 23, mounted on the pipe 38. Said float valve 23 comprises a float placed on a small basin 24 communicating with the tank 1, said valve being so adjusted as to open and permit an outflow of pure water, as the level of the water tends to lower below a predetermined minimum value, while an overflow device (not shown) is also provided to discharge water, as the water level into the tanks 1 tends to overpass a maximum predetermined level. Upon the rotation of the shaft 18, of the drum 7, 7a, of the helical blades 13 and 19, and of the bucket drums 14 and 20 in the drum 7, 7a takes place the separation, the collection and the removal of the gravel and crushed stones, discharged on the heap 12, while the water together with the cement and sand continues its travel along the tank 1 under the push of the helical blade 13, during said slow travelling forwards the sand tending to deposit on the bottom of said tank 1. The helical blade 13 sliding along the bottom of the tank 1 pushes the sand forwards towards the drum 14 by which said sand is collected by means of the perforated buckets 14a which lift the material discharge it on the outside through the conveyor 16 on the heap 17.

The second helical blade 19 has an opposite pitch with respect of that of the blade 13 and serves to move back towards the bucket drum 14, 14a the sand which is eventually still retained in the water overpassing the unit 14, 14a and which deposits on the bottom of the last section of the tank 1.

The water which carries in suspension only the cement at the end 1b of the tank 1 is continuously collected by the buckets 20a having solid walls which are carried by the revolving shifting apparatus 20 and is discharged into the channel 21 ending in the second tank 22. The water having the cement in suspension is fed into the tank 22 near its end 22a and the cement deposits on the bottom of this tank where means are provided to gradually reduce any water movement in order to promote the cement decantation and deposit.

The tank 22 is rectangular in plan view, and has a substantially trapezoidal longitudinal vertical section so as to have a bottom which comprises a first front portion 25a near the cement discharge head 22a which is slightly bent downwardly towards the rear head of the tank 22, an intermediate portion 25 which is substantially horizontal and a last portion 25a having a great slope and which cooperates to form the rear end of the tank 22. Along the bottom 25a to 25c slides the lower flight of an endless conveyor generally marked 26 and comprising a plurality of scraping transverse angle bars carried by a pair of chains 28 supported by pairs of upper gear wheels 29 (at least a pair of which comprises driving gear wheels) and by eventual other idle carrying and/or guiding gear wheels (not shown in the drawings). The operative lower flight of the endless conveyor 26 by means of its scraping blades 27 slides into contact with the bottom 25a to 25c of the tank 22 under the effect of the force of gravity.

Figure 3:
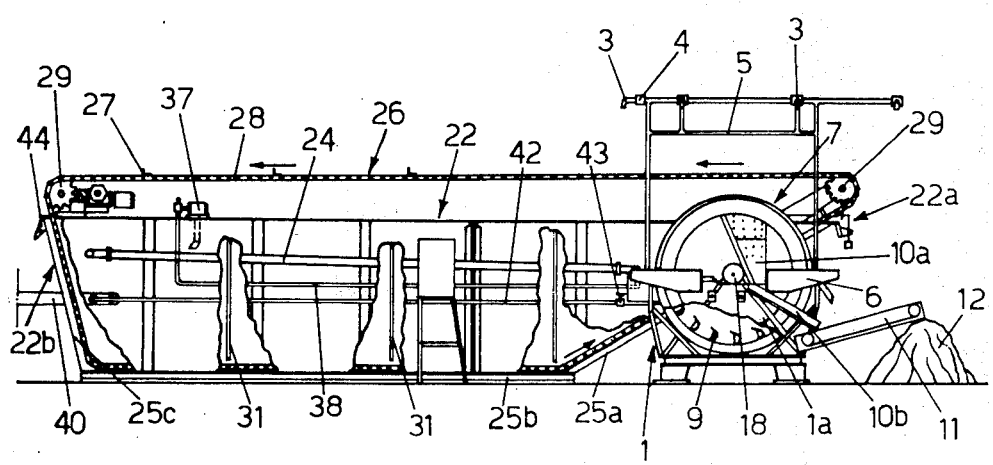
FIG. 3 is an elevational side view of the apparatus, taken on line B—B of FIG. 1 with parts broken away.

The endless conveyor 26 travels in the direction of the arrows in FIG. 3 and by its scraping bars 27, a limb 27a of which is perpendicular to the supporting chains 28 acts as scraping blades scraping away and pushing forwards the cement along the portion 25b of the bottom and then upwardly along the inclined portion 25a so as to carry it over the upper edge of the tank head 22a and discharge it onto the heap 30. In the inside of the tank 22 vertical transverse partitions 31 are provided spaced away from the bottom so as to allow the scraping bars 27 of the lower flight of the endless conveyor 26 to freely pass underneath, said partitions having the task to damp the water turbulence as soon as the water moves towards the end 22b of the tank 22 so that said water tends to become motionless, thus promoting the decantation of the cement on the bottom of said tank 22.

Figure 4:
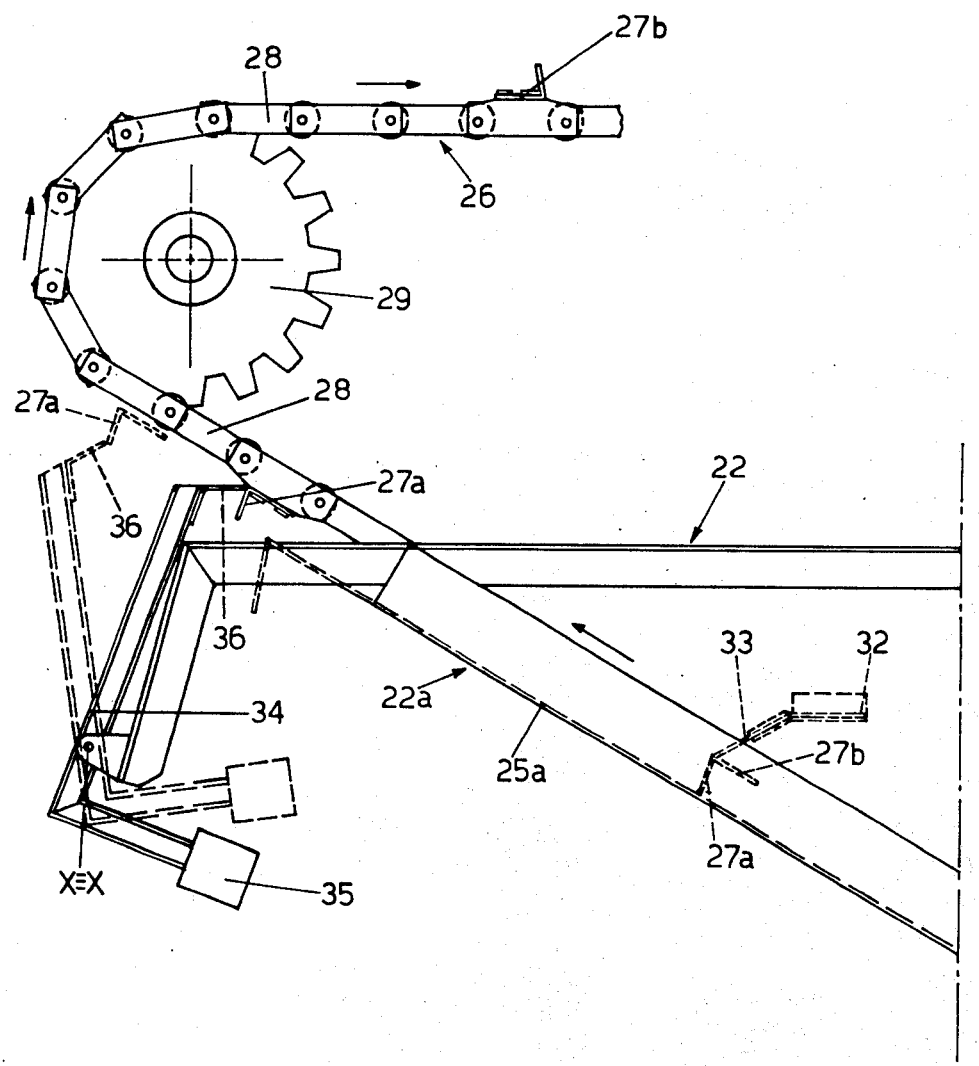
FIG. 4 is an enlarged partial longitudinal section of the devices for the cleaning of the scraping blades mounted on chains and operating into the second tank to discharge the cement, said section being taken on line C—C of FIGS. 1 and 2.

The bar conveyor 26 moves very slowly, thus it practically does not agitate the water into the tank 22. Means are provided to remove cement from the scraping angle bars and which could be retained on said bars. For such a purpose two cleaning devices are provided which can be only seen in FIG. 4, one of which is motionless and operates at the inside of the tank 22 and the other is swingable and operates on the outside of the tank end 22a where the cement is discharged.

The motionless cleaning device operates on the bars of the lower flight of the conveyor 26 near the tank end 22a and consists of a rigid cross bar 32 having a depending strip 33 made of slightly flexible material, as rubber, for instance, which slides in contact with the limbs 27b of the angle bars 27 passing underneath; thus said strip 33, removes therefrom the cement adherent thereto. The swingable cleaning device is constituted of a frame in the form of a reversed U, the parallel arms 34 of which are pivotally mounted about a common transverse axis X—X, said arms being connected with balance wheights 35 which tend to maintain the transverse bar 36 of the U-frame pressed against the conveyor 26, said bar 36 acting as scraping blade.

The inclination of the scraping bar 36 and the length of the pivot arm are such that as a bar 27 faces the scraping bar 36 of the movable cleaning device, the angle bar 27 which with its limb 27a has pushed forwards the cement which has been collected from the bottom 25a to 25c up to pass over the upper edge of the wall 25a so as to fall down on the heap 30, causes the bar 36 to be moved backwards so that the U-frame rotates about the axis X—X, while the longitudinal lower edge of the scraping blade 36 slips with pressure under the effect of the weights 35 on the surface 27a of the facing bar 27, thus removing the cement therefrom which is also caused to fall down on the heap 30.

As has hereinabove been already stated, provision is made to use in the apparatus the recovery water, which therefore operates according to a closed cycle, with a considerable saving of running expenses.

For such a purpose near the end 22b of the second tank 22 where the water is well purified a pump 37 is provided feeding water through the pipe 38 to the distribution pipes 5; of course, said pump 37 will be actuated after at least one of the control push buttons has been pressed and only under the consent of a reservation unit.

The tank 22 is connected to the tank 1 through a pipe 39 ending in said basin 24 communicating with the tank 1, said pipe being controlled by the said float valve 23.

The level of the water in the tank 22 is always higher than that of the tank 1 so that the passage of the water from the tank 22 to the tank 1 is due only to the force of gravity, but it is controlled by the float valve 23 so that into the tank 1 is fed only an amount of water sufficient to maintain the minimum predetermined level. At 40 is indicated a pipe for the connection of the apparatus to the water supply network (FIG. 1), said pipe ending into the tank 22 with an outflow orifice which is controlled by another float valve 41, while from the pipe 40 another pipe 42 is branched ending into the tank 1 and having an outflow orifice controlled by an adjustable cock 43, said pipe 42 thus providing a small constant supply of pure water for the dilution of the water in the tanks 1 and 22, so as to reduce its salinity which as the work continues for a long time interval could attain too high a value.

In the tank 22 is also provided an overflow pipe 44. Further a centralized control panel 45 is provided associated with a programmer controlled by reservation push-buttons or by a main control switch.

It has to be noted that at the end of a working day or as the work to be performed is over, after having duly cleaned the last automotive mixer 2, it is necessary to continue the working in the tanks 1 and 22 up to the end of purification and separation cycle.

In the practice the treatment which is carried out in the first tank 1 can be considered completed after about 2 or 3 hours from the last discharge of washing water, while the treatment which takes place in the second tank 22 must be continued beyond said time interval so as to permit all the water which has been fed into the first section of the tank 22 becomes entirely motionless, since in said water a turbulence is induced during the operative cycle under the effect of the continuous feeding of water conveyed through the feeding channel 21 so as to ensure the complete decantation of the cement also on the portion 25a of the tank bottom. At the end of the work the personnel must close the cock 43 and also operate a time remote control switch which is mounted on the control panel 45 and which is provided to stop the driving shaft 18 after a predetermined time interval and then after another predetermined time interval to stop the transmission of the motion to the bar conveyor 26.

I claim:

1. Apparatus for the separation of the components of an aqueous concrete grout which includes gravel and crushed stones, sand, cement and water obtained from the washing with water of concrete receptacles, such as revolving drums of automotive concrete mixers, comprising first and second tanks each having an input and an output operatively connected in series, first separating means mounted in said first tank for separating and discharging the gravel and crushed stones of the aqueous concrete grout, second separating means mounted in said first tank and arranged subsequently of said first separating means for separating and discharging the sand of the aqueous concrete grout, means arranged at the output of said first tank for feeding the cement and water of the aqueous concrete grout to the input of said second tank, third separating means mounted in said second tank for separating and discharging the cement of the aqueous concrete grout, distribution means for conveying the water from said second tank to the concrete receptacles and means at the input of said first tank for receiving the aqueous concrete grout from the concrete receptacles.

2. Apparatus according to claim 1 including means for supplying controlled amounts of water into said first and second tanks to reduce the salinity of the working water and to compensate for water loss and means for recirculating the water from said second tank to said first tank.

3. Apparatus according to claim 1 wherein said first tank is of a semi-cylindrical shape and including a coaxial shaft rotatably mounted along said first tank and means for rotating said shaft, said first separating means comprising a perforated drum fixedly mounted to said shaft and having a first helical blade means affixed interiorly thereof and arranged for conveying material collected therein to bucket means circumferentially arranged at one end of said drum for discharing the gravel and crushed stones of the aqueous concrete grout, a second helical blade means mounted on said shaft in sliding contact with the inner surface of said first tank between said first and second separating means for conveying material in the bottom of said first tank to said second separating means, said second separating means comprising a tubular body fixedly mounted coaxially of said shaft, said tubular body including a plurality of perforated buckets for collecting and discharging the sand of the aqueous concrete grout.

4. Apparatus according to claim 3 wherein said means for feeding the cement and water of the aqueous concrete grout from said first tank to said second tank comprises a plurality of imperforate buckets mounted on said shaft and including a third helical blade means mounted on said shaft between said second separating means and said feeding means for conveying material in the bottom of said first tank to said second separating means.

5. Apparatus according to claim 1 wherein said third separating means comprises an endless conveyor arranged longitudinally of said second tank, said conveyor having an upper and lower flight and a plurality of scraping bars arranged transversely thereof, the lower flight of the conveyor being arranged such that the scraping bars, under the force of gravity, slide in contacting relation with the bottom of said second tank, the upper flight of the conveyor being arranged in superposed relation to said second tank and means for cleaning material from said scraping bars.

6. Apparatus according to claim 5 including partition means mounted in said second tank between said upper and lower conveyor flights, for damping the movement of water in said second tank.

7. Apparatus according to claim 5 wherein said cleaning means include first and second cleaning devices mounted to said second tank adjacent the discharge output thereof, said first cleaning device comprising a cross member arranged between said upper and lower conveyor flights and having a flexible strip mounted thereto for sliding on and removing the material on a first surface of said scraping bars, said second cleaning device comprising a blade arranged on a counterbalanced frame pivotable transversely of said conveyor, said blade arranged to contact and remove the material on a second surface of said scraping bars as said frame is pivoted by the force of said scraping bars acting on said blade.

8. Apparatus according to claim 1 wherein said distribution means comprises a pump having an input and output, the input of said pump being arranged to draw water from said second tank, a plurality of washing stations each connected to the output of said pump, each of said washing stations having control means for actuating said pump and a programmer means connected between said control means and said pump for programming the distribution of water to said washing stations in the sequence of actuation of said control means.

9. Apparatus according to claim 8 wherein said programmer means further includes timer means for terminating the operative cycle of the first tank after a first predetermined time interval and for terminating the operative cycle of the second tank after a second predetermined time interval.

10. Apparatus according to claim 1 including means for maintaining the height of water in said second tank at a higher level than the height of water in said first tank.

* * * * *

UNITED STATES PATENT AND TRADEMARK OFFICE
CERTIFICATE OF CORRECTION

PATENT NO. : 3,962,086
DATED : June 8, 1976
INVENTOR(S) : LIONELLO ROSSI

It is certified that error appears in the above-identified patent and that said Letters Patent are hereby corrected as shown below:

In the heading of the patent, [30] Foreign Application Priority Data, add --December 3, 1973   Italy   54061/73--;

Column 1, line 38, after "stones" insert --having been removed from said water--;

Column 2, line 3, after "1a" insert --of--;

Column 2, line 64, after "in" delete "cntact" and insert --contact--;

Column 3, line 46, after "material" insert --and--;

Column 5, line 40, after "of" insert --the--.

Signed and Sealed this

Fourth Day of January 1977

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,962,086     Dated June 8, 1976

Inventor(s) Lionello Rossi

It is certified that error appears in the above-identified patent and that said Letters Patent are hereby corrected as shown below:

On the title page item "[30]" add.

-- Dec. 3, 1973     Italy---------54061/73    --.

Signed and Sealed this

Twenty-second Day of February 1977

[SEAL]

Attest:

RUTH C. MASON  
Attesting Officer

C. MARSHALL DANN  
Commissioner of Patents and Trademarks